United States Patent
Senf

(10) Patent No.: US 10,555,509 B2
(45) Date of Patent: Feb. 11, 2020

(54) NESTING CRAB TRAP

(71) Applicant: Edward Senf, Petaluma, CA (US)

(72) Inventor: Edward Senf, Petaluma, CA (US)

( * ) Notice: Subject to any disclaimer, the term of this patent is extended or adjusted under 35 U.S.C. 154(b) by 127 days.

(21) Appl. No.: 15/976,076

(22) Filed: May 10, 2018

(65) Prior Publication Data
US 2019/0343100 A1 Nov. 14, 2019

(51) Int. Cl.
*A01K 69/08* (2006.01)
(52) U.S. Cl.
CPC .................................... *A01K 69/08* (2013.01)
(58) Field of Classification Search
CPC ......... A01K 69/00; A01K 69/08; A01K 69/10
See application file for complete search history.

(56) References Cited

U.S. PATENT DOCUMENTS

| | | | | |
|---|---|---|---|---|
| 3,191,338 A * | 6/1965 | Burgess | ............... | A01K 69/08 43/102 |
| 3,300,890 A * | 1/1967 | Thomassen | ............ | A01K 69/10 43/100 |
| 3,319,373 A * | 5/1967 | Gale | ...................... | A01K 69/08 43/100 |
| 3,699,702 A * | 10/1972 | Lankenau | .............. | A01K 69/08 43/100 |
| 3,786,593 A | 1/1974 | Gerbrandt | | |
| 5,478,273 A * | 12/1995 | Ives | ....................... | A01K 69/10 43/100 |
| 7,533,486 B2 | 5/2009 | De Matos | | |
| 7,886,480 B2 | 2/2011 | Philbrook | | |
| 8,015,748 B2 | 9/2011 | Teo | | |
| 2005/0268528 A1 * | 12/2005 | Hibbs | .................... | A01K 69/10 43/105 |
| 2011/0271584 A1 * | 11/2011 | Stearns | .................. | A01K 69/08 43/100 |
| 2017/0196208 A1 * | 7/2017 | Ferguson | ............... | A01K 69/08 |

FOREIGN PATENT DOCUMENTS

CA 2951946 A1 * 6/2017 ............ A01K 69/08
GB 2201871 * 9/1988

* cited by examiner

*Primary Examiner* — Christopher R Harmon

(57) ABSTRACT

A structurally sound circular crab trap suitable for commercial crab fishing, designed to be stacked one inside another to facilitate transport.

3 Claims, 6 Drawing Sheets

NESTING CRAB TRAP

CROSS-REFERENCES TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

1. Field of the Invention

The present invention relates to crab traps. More specifically, the present invention relates to traps suitable for industrial fishing that nest together when stacked.

2. Description of the Related Art

A wide variety of traps are available for both recreational and commercial crab fishing. Commercial crab fisherman have long had an issue with transportation of their crab traps as they are necessarily quite heavy and bulky. Many versions of collapsible traps have been developed to facilitate transport, such as that disclosed in U.S. Pat. No. 8,015,748 issued to Lian Hing Teo Sep. 13, 2011 which folds into an umbrella shape, and U.S. Pat. No. 7,886,480 issued to Philbrook Feb. 15, 2011 which is round with flat sections that fold inward. These inventions, although lighter and easier to carry, do not have the structure needed for the harsh ocean environment in which they are deployed. In addition, they require difficult assembly and disassembly, which is not ideal for a commercial crab fisherman who needs to deploy many crab traps at a time. Several square or rectangular shaped collapsible traps have also been invented, such as those disclosed in U.S. Pat. No. 7,533,486 issued to De Matos May 19, 2009, and U.S. Pat. No. 3,786,593 issued to Gerbrandt Jan. 22, 1974. Although some of these are easier to assemble, they do not have the ideal round shape so the crabs can easily circle and find the entrance. In addition, all of these collapsible traps have a drawback that they do not have sufficient structure to prevent tipping and buckling when deployed.

The present invention resolves these issues by providing a circular trap with a sound structure that is designed to nest inside other traps of the same design for easier transport. Because the traps are stackable, they take up less space and they can be easily moved around the boat in columns. In addition, there is no difficult assembly required to deploy them or disassembly required after bringing in the catch.

BRIEF SUMMARY OF THE INVENTION

The present invention is a circular crab trap with a bottom diameter that is slightly smaller than the top diameter and at least six vertical side support bars. The two tunnels are each located between two of the vertical side support bars and have a structural horizontal bar at their top which is located one half to two-thirds up from the bottom ring. The two remaining side support bars have structural supports built in at the same height as the tunnels' horizontal bars. When stacked, the traps nest, one inside the other, and the top trap rests on the top of the tunnels and the structural supports. The majority of the construction is made of stainless steel, including stainless steel netting on the sides and bottom. The top cover is constructed of one semi-circular stainless steel rod and nylon netting that is firmly attached around one half of the top ring and the semi-circular rod. When the semi-circular rod is in the closed position, the nylon netting is pulled tight, and when opened, the nylon netting can be completely pushed to the side to allow nesting of another trap inside. There are weight bars made of iron to provide the anode needed to conduct electricity away from the stainless steel structure, escape rings for fish and wildlife, and additional structural steel elements that provide support to maintain the integrity of the structure and prevent buckling when deployed in deep sea conditions.

BRIEF DESCRIPTION OF THE SEVERAL VIEWS OF THE DRAWINGS

A more complete understanding of the present invention may be derived by referring to the detailed description when considered in connection with the figures, wherein like reference numbers refer to similar items throughout the figures, and.

DETAILED DESCRIPTION OF THE INVENTION

In the following detailed description of the invention, reference is made to the accompanying drawings which form a part of the disclosure and which show by way of illustration, and not of limitation, specific embodiments by which the invention may be practiced. The drawings, the foregoing discussion, and the following description are exemplary and explanatory only, and are not intended to limit the scope of the invention or its application in any manner.

The present invention is a Nesting Crab Trap 100 with an external frame that is comprised of a Bottom Ring 109, a Top Ring 102, at least six Vertical Support Bars 104, and a Bottom Cross Bar 106. The Bottom Ring 109 and the Top Ring 102 are preferably made from round stainless steel bars that are wrapped with rubber. The stainless steel provides corrosion resistance and the size of the bars is large enough to provide the strength required to ensure the integrity of the structure when deployed. The rubber wrap prevents slipping and damage when the traps are moved. The Bottom Ring 109 is slightly smaller than the Top Ring 102, such that the Bottom Ring 109 of one Nesting Crab Trap 100 can fit inside the Top Ring 102 of another Nesting Crab Trap 100 without pinching, but the interior area of each Nesting Crab Trap 100 is maximized. The Bottom Cross Bar 106 provides stiffness and structural support to prevent buckling of the Bottom Ring 109 under high stress, and there are at least two stainless steel Escape Rings 103 that attach to the Top Ring 102 and a Vertical Support Bar 104 to provide an escape path for fish and other wildlife. There are two large Iron Bars 105 attached to the Bottom Ring 109 to provide cathodic protection, weight to keep the trap on the bottom of the ocean, and rigidity for the structure.

There are two Tunnels 301 on opposites sides that are attached to two of the Vertical Support Bars 104. The Tunnels 301 have prongs 108 that are attached to the inner top bar of the Tunnel 301 such that they rotate inward only to allow the crabs to enter the trap, but not allow them to exit. The outer edge of the top of the Tunnels 301 is formed by a Horizontal Structural Support Bar 107, that provides a resting point for the inner diameter of another Nesting Crab Trap 100 when installed on top. There are at least two Rounded Nesting Supports 101 attached to the Vertical Support Bars 104 such that the top of each Rounded Nesting Support 101 is at the same height as the Horizontal Structural Support Bars 107. The Rounded Nesting Supports 101 provide additional resting points for the inner Nesting Crap Trap 100 when installed on top. The Rounded Nesting Supports 101 keep the inner trap from tipping, and the rounded edge ensures no damage when stacking or unstacking the Nesting Crab Traps 100.

Figure 1:
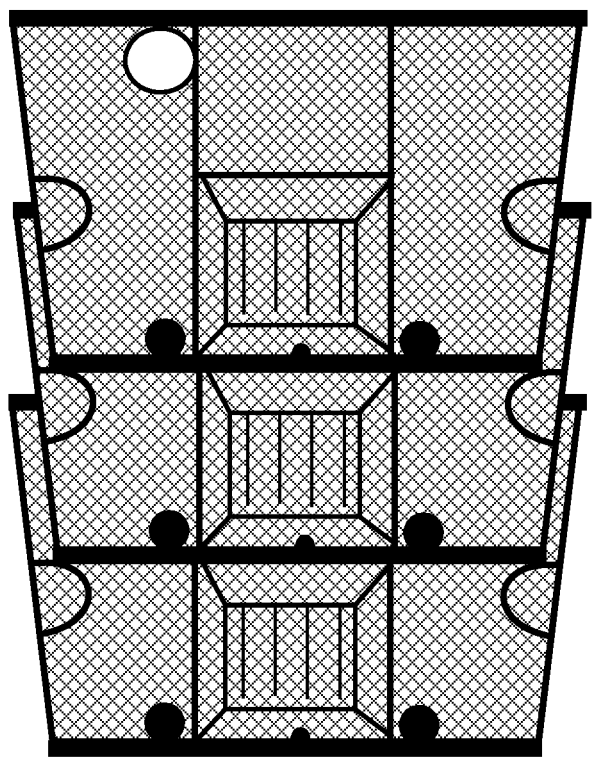
FIG. 1 is a side view of three nested crab traps.
Figure 2:
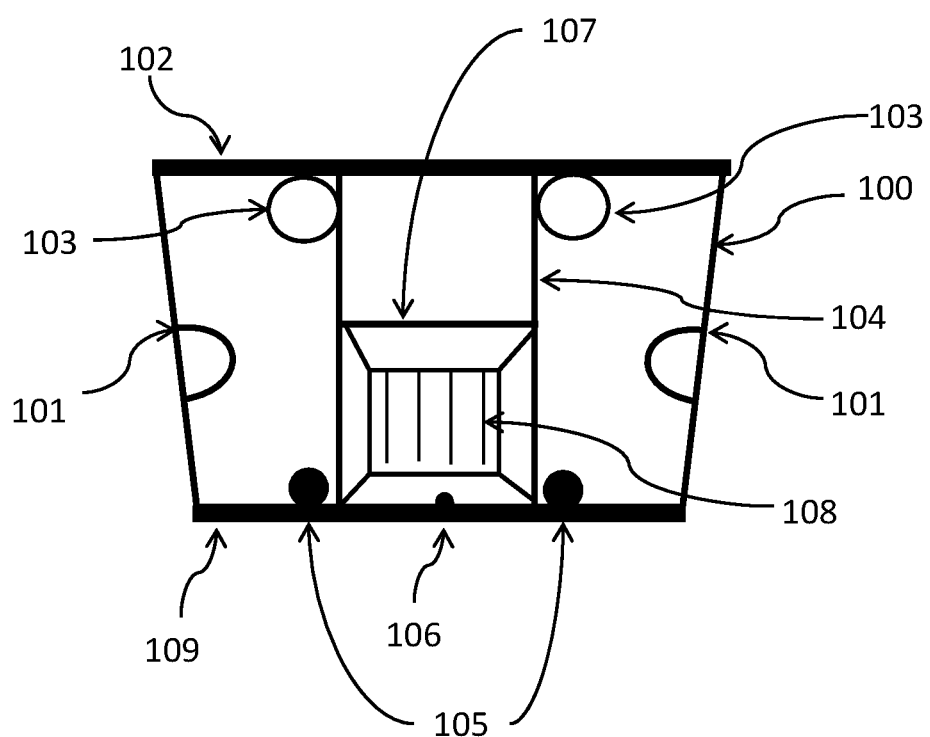
FIG. 2 is a side view of one crab trap shown without the steel netting, showing the tunnels and the side structural supports for nesting.
Figure 3:
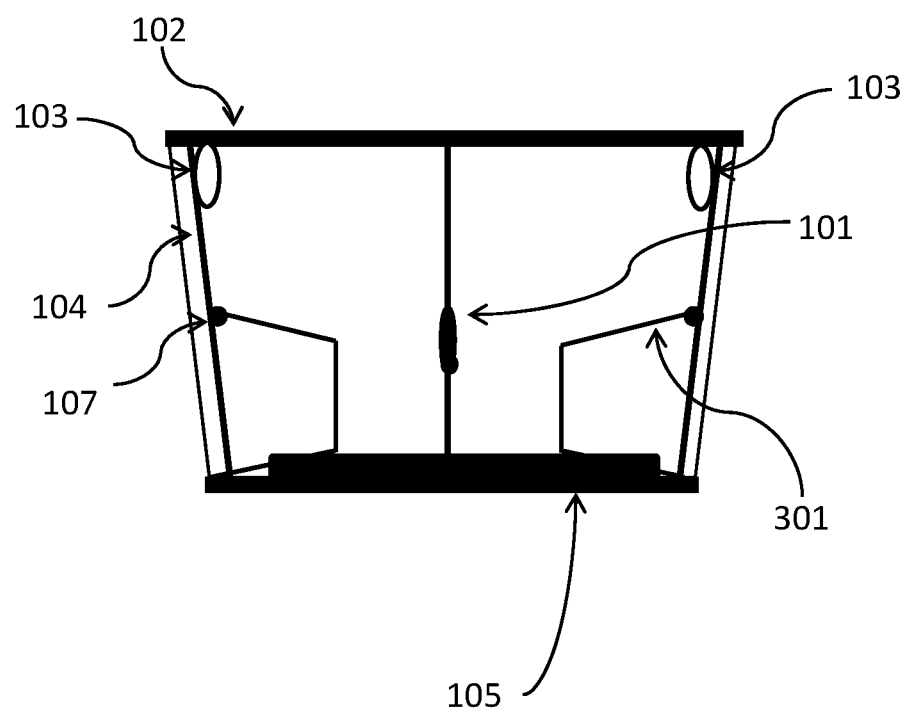
FIG. 3 is a side view taken perpendicular to the side view of FIG. 2 without the steel netting and showing the location of the structural supports and the weight bars.
Figure 4:
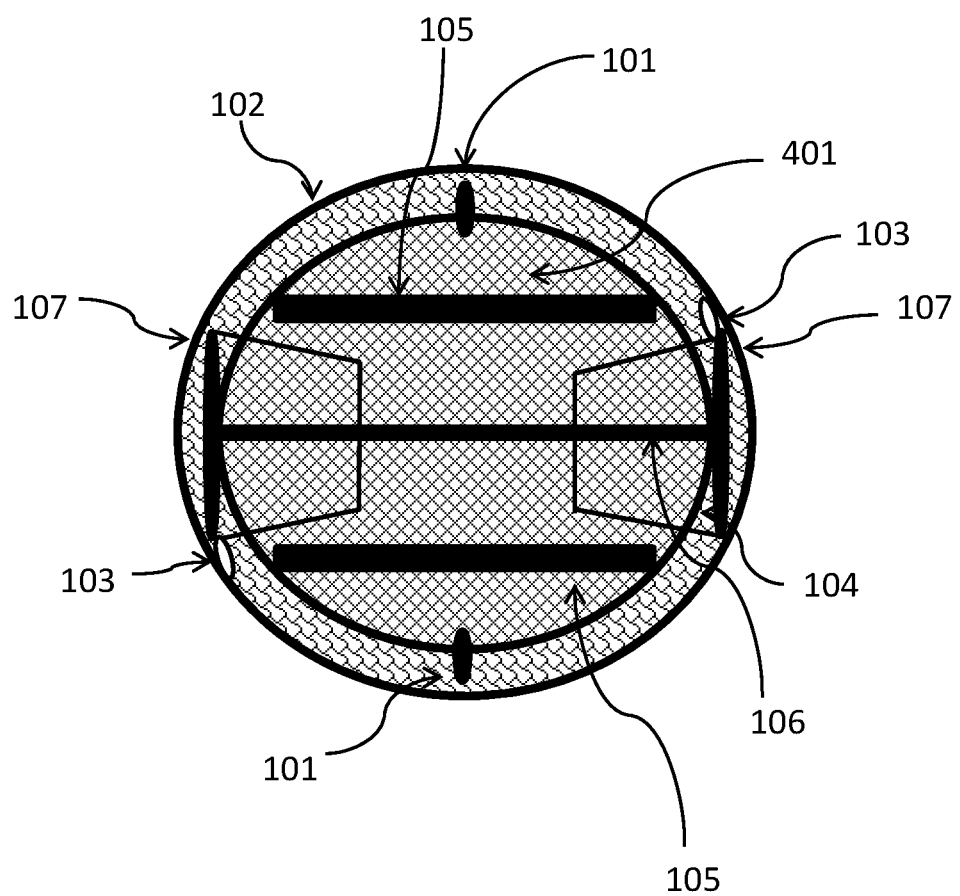
FIG. 4 is a top view shown without the top cover.
Figure 5:
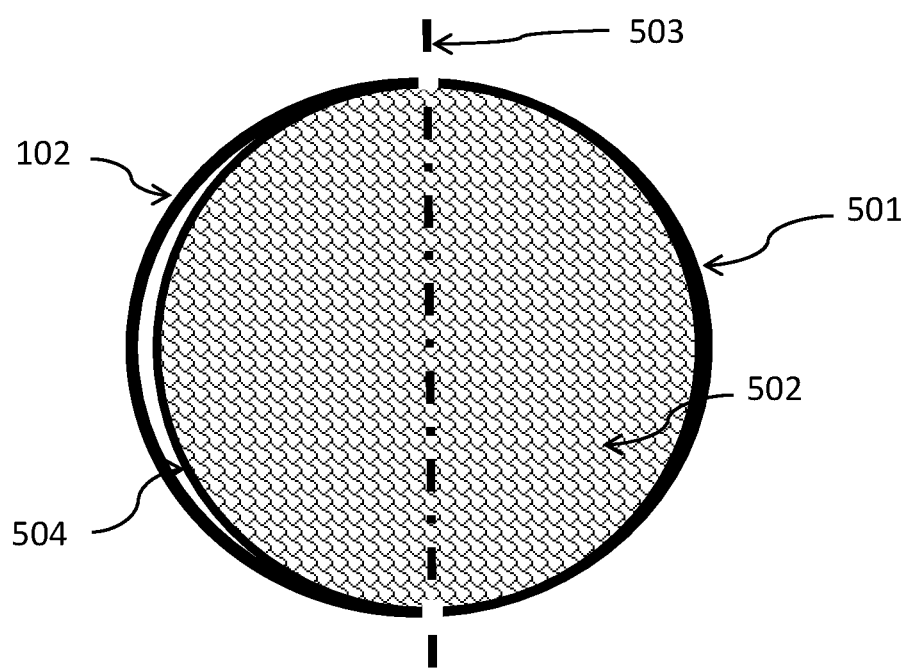
FIG. 5 is a top view shown with the top cover closed.
Figure 6:
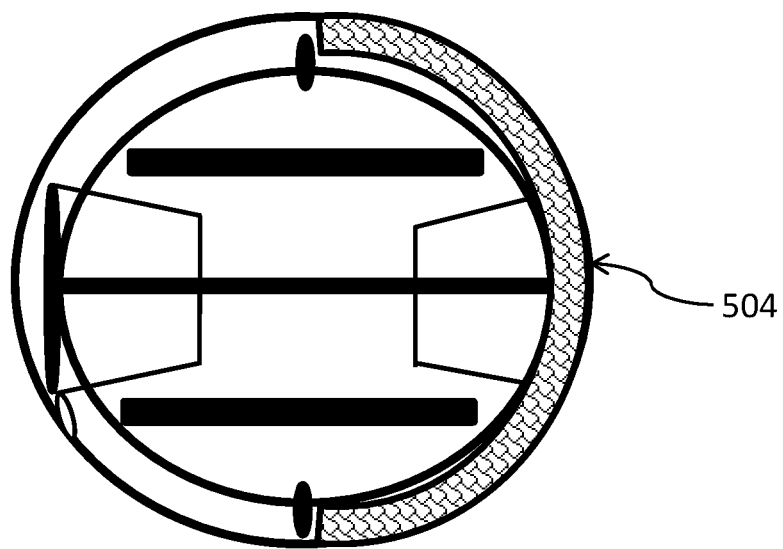
FIG. 6 is a top view shown with the cover open and without the stainless steel netting.

There is stainless steel Netting 401 on the bottom and sides of the Nesting Crab Trap 100 and on the Tunnels 301 as shown in FIGS. 1 and 4. The stainless steel Netting 401 is not placed over the Escape Rings 103 or the external sides of the Tunnels 301. The Top Cover 501 is formed by a round piece of Nylon Netting 502, that is stretched and securely attached to the Top Ring 102 on one side of a Center Axis 503 and to a Semi-Circular Rod 504 on the other side of the Center Axis. When the Semi-Circular Rod 504 is moved to the closed position, the Nylon Netting 502 is pulled tight as shown in FIG. 5. When the Semi-Circular Rod 504 is moved to the open position, the nylon netting can be completely pushed aside as shown in FIG. 6 to allow insertion of another trap into the nested position.

Many modifications and variations of this invention may be made without departing from its spirit and scope, as will be appreciated by those skilled in the art. The embodiment as described herein was chosen and described in order to best explain the principles of the invention and its practiced applications.

What is claimed is:

1. A nesting crab trap comprising: a top ring and a bottom ring with an outer diameter that is slightly smaller than the inner diameter of the top ring connected to each other by at least six vertical support bars; a semi-circular top bar; at least two rounded nesting supports; at least two tunnels that are each attached to two of the vertical support bars; at least two escape rings attached to the top ring; steel netting; nylon netting; and at least two cathodic bars attached to the bottom ring; wherein the round nylon netting is stretched over and securely attached to one half of the top ring and to the entire semi-circular top bar such that when the semi-circular bar is placed over the other half of the top ring, a flat nylon netting top is created; steel netting is stretched across and securely attached to the entire bottom ring and between the vertical support bars from the bottom ring to the top ring except over the two tunnels and the escape rings; steel netting is securely attached to the top, bottom and two sides of the tunnels; the interior walls of the two tunnels have inwardly rotatable prongs that allow crabs to enter but not to exit; the rounded nesting supports are attached to the vertical support bars that are not attached to entry cages such that the tops of the rounded nesting supports are at the same height as the top of the tunnels and the rounded nesting supports protrude toward the center to a diameter that is smaller than the outer diameter of the bottom ring.

2. The nesting crab trap of claim 1 wherein the top ring and bottom ring are made of stainless steel and wrapped with rubber.

3. The nesting crab trap of claim 1 with a structural support bar extending across the bottom of the bottom ring.

\* \* \* \* \*